United States Patent
Shah et al.

(10) Patent No.: US 7,848,230 B2
(45) Date of Patent: Dec. 7, 2010

(54) SHARING PERFORMANCE MEASUREMENTS AMONG ADDRESS PREFIXES OF A SAME DOMAIN IN A COMPUTER NETWORK

(75) Inventors: Pritam Shah, Fremont, CA (US); Rahul G. Patel, Nashua, NH (US); Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 12/266,182

(22) Filed: Nov. 6, 2008

(65) Prior Publication Data

US 2010/0110891 A1 May 6, 2010

(51) Int. Cl.
*H04J 1/16* (2006.01)
*H04L 12/28* (2006.01)
*H04L 12/56* (2006.01)

(52) U.S. Cl. .......... 370/229; 370/230.1; 370/235; 370/236; 370/250; 370/252; 370/255; 370/351; 709/224; 709/239; 709/240; 709/244

(58) Field of Classification Search .......... 370/229, 370/230, 230.1, 232, 234, 235, 236, 236.2, 370/237, 238, 241, 241.1, 242, 244, 248, 370/249, 250, 252, 254, 255, 351; 709/220, 709/221, 223, 224, 239, 240, 242, 244
See application file for complete search history.

(56) References Cited

U.S. PATENT DOCUMENTS

| | | | |
|---|---|---|---|
| 6,795,860 B1 | 9/2004 | Shah | |
| 6,981,055 B1 * | 12/2005 | Ahuja et al. | 709/238 |
| 7,123,620 B1 | 10/2006 | Ma | |
| 7,193,968 B1 | 3/2007 | Kapoor et al. | |
| 7,333,501 B2 | 2/2008 | Cook et al. | |
| 7,447,167 B2 | 11/2008 | Nadeau et al. | |
| 7,496,651 B1 * | 2/2009 | Joshi | 709/223 |
| 7,551,551 B2 * | 6/2009 | Filsfils et al. | 370/219 |
| 7,581,022 B1 * | 8/2009 | Griffin et al. | 709/238 |
| 7,619,982 B2 * | 11/2009 | Blair et al. | 370/248 |
| 2003/0204619 A1 * | 10/2003 | Bays | 709/238 |
| 2005/0083936 A1 | 4/2005 | Ma | |
| 2006/0120288 A1 * | 6/2006 | Vasseur et al. | 370/235 |
| 2006/0200579 A1 * | 9/2006 | Vasseur et al. | 709/238 |
| 2008/0209030 A1 * | 8/2008 | Goldszmidt et al. | 709/224 |
| 2009/0147692 A1 * | 6/2009 | Hasan et al. | 370/252 |
| 2009/0198832 A1 * | 8/2009 | Shah et al. | 709/239 |

OTHER PUBLICATIONS

Osma et al, D3.1: Initial Specification of Mechanisms, Alghorithms and Protocols for Engineering the Parallel Internets, AGAVE consortium, Document Identifier: AGAVE/WP3/UniS/D3.1/final/public, Dec. 14, 2006, pp. 1-91.*

* cited by examiner

*Primary Examiner*—Chi H Pham
*Assistant Examiner*—Ahmed Elallam
(74) *Attorney, Agent, or Firm*—Cesari and McKenna, LLP (57) ABSTRACT

In one embodiment, performance measurements may be obtained at a local domain from a set of one or more responding targets of a particular remote domain. The performance measurements may then be applied to prefix-specific policies of any corresponding destination address prefix within the particular remote domain, such that traffic destined to a particular prefix of the particular remote domain may be routed from the local domain based on the corresponding prefix-specific policies and applied performance measurements.

22 Claims, 5 Drawing Sheets

SHARING PERFORMANCE MEASUREMENTS AMONG ADDRESS PREFIXES OF A SAME DOMAIN IN A COMPUTER NETWORK

TECHNICAL FIELD

The present disclosure relates generally to computer networks, and, more particularly, to domain exit selection.

BACKGROUND

In certain computer network configurations, a particular network domain (e.g., an autonomous system, or "AS") may be "multi-homed" to the computer network, such that multiple paths or exits are available to that network domain to reach destination address prefixes located in a remote network domain. For example, this multi-homing may be provided by interconnecting the particular network domain to a plurality of service providers (e.g., Internet Service Providers, "ISPs"), often in order to achieve redundancy in the event of a failure, and/or to provide a mechanism that may be used to load balance (e.g., distribute) traffic destined to a remote domain.

In addition, since multiple paths/exits are available to a local network domain, various techniques have been established that may distribute traffic across the multiple exits based on performance measurements of particular traffic-classes. For example, through either passive monitoring or active probing for each traffic-class, traffic for each traffic-class may be routed/forwarded over a specific best performing path/exit to reach a particular destination address prefix in a remote domain.

These performance measurements, however, while being generally accurate in determining a best performing path per-traffic class and per-prefix, may suffer from various shortcomings. For example, in certain situations only a few probe targets may be known/available for a particular traffic-class and destination address prefix. As such, if those targets are non-responsive (e.g., firewalls, network address translation or "NAT" issues, etc.), then probing those targets for traffic optimization results in the traffic-class to that destination address prefix being classified as unreachable, and thus is not controlled based on a best performing path, regardless of whether other destinations within that prefix are reachable. Also, determining a best performing path per-traffic class and per-prefix may require a large number of probes (and probe targets, e.g., to reduce the occurrence of the example mentioned above), which is poorly scalable for large networks.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a local domain may obtain performance measurements from a set of one or more responding targets of a particular remote domain (e.g., active probe message transmission or passive monitoring). The performance measurements may then be applied to prefix-specific policies of any corresponding destination address prefix within the particular remote domain, such that traffic destined to a particular prefix of the particular remote domain may be routed from the local domain based on the corresponding prefix-specific policies and applied performance measurements.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a node that interconnects different domains together is generally referred to as an "edge node/router" (or "border node/router").

Figure 1:
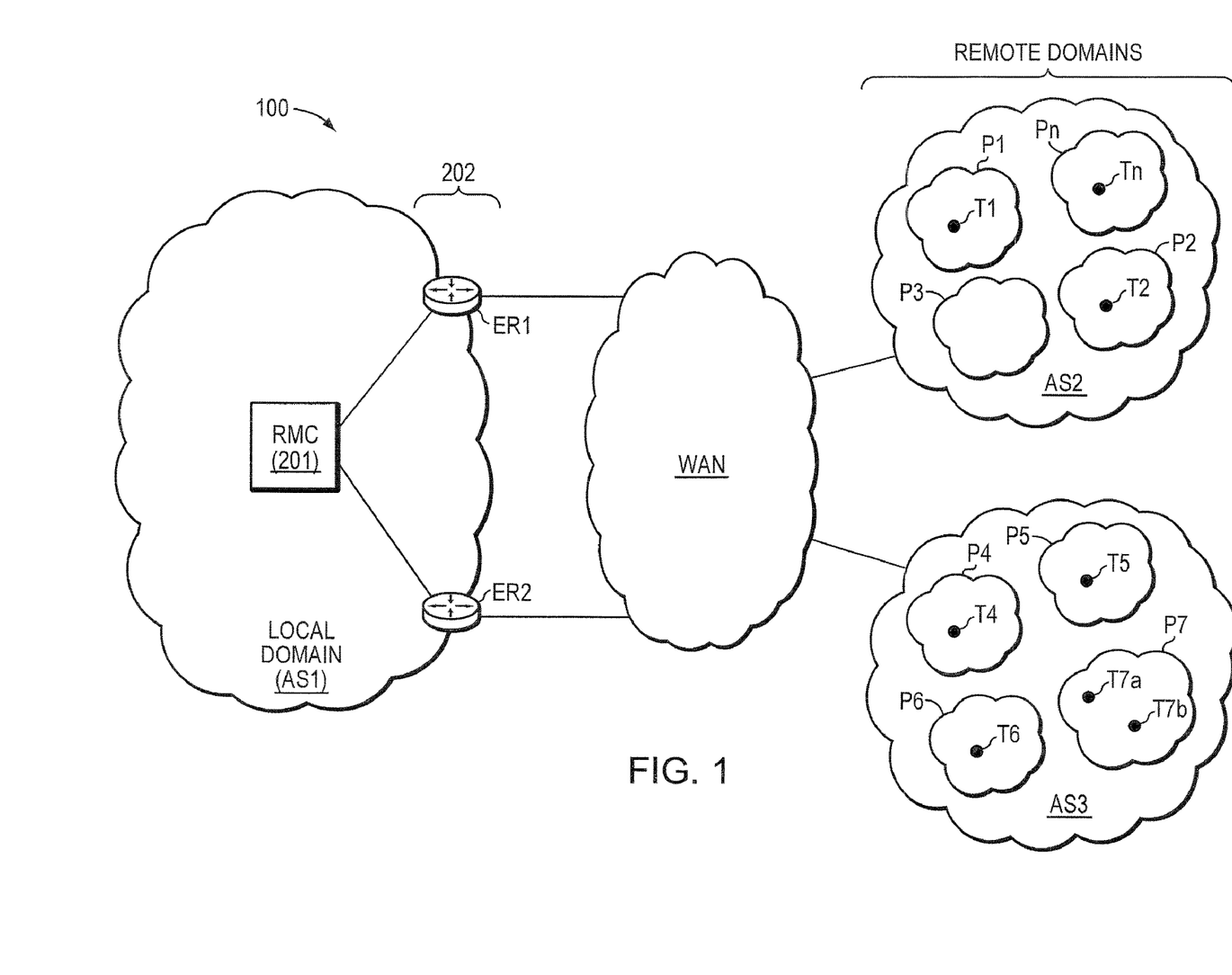
FIG. 1 illustrates an example computer network.

FIG. 1 is a schematic block diagram of an example computer network 100 illustratively comprising various nodes/devices of various domains interconnected by links as shown (notably, not all nodes/devices are shown for simplicity). Illustratively, each domain may comprise one or more interdomain/edge routers, e.g., ER1-ER2 of the local domain, through which client communications, such as data packet traffic, may pass into and out of the domain. In general, each domain may be an AS, an enterprise network, a service provider network (an "ISP"), or any other network or subnetwork. Furthermore, each domain, illustratively the local domain, may be multi-homed, i.e., comprising a plurality of different peer (neighboring) connections to one or more other routing domains or ASes (e.g., the local domain AS1 to a WAN (or first-hop domains/ISPs, not explicitly shown)). In addition, routing operations at certain edge nodes ER1-ER2 may be managed by a routing master controller (RMC) 201, such as in accordance with optimized edge routing (OER, or "performance routing") as described herein (e.g., as an OER "Master node" or OER master controller), which may be connected to the edge nodes by, e.g., point-to-point links or a local area network.

Data packets (e.g., traffic) may be exchanged among the nodes/devices of the computer network 100 using predefined network communication protocols such as the TCP/IP, User Datagram Protocol (UDP), Asynchronous Transfer Mode (ATM) protocol, Frame Relay protocol, Internet Packet Exchange (IPX) protocol, etc.

Figure 2:
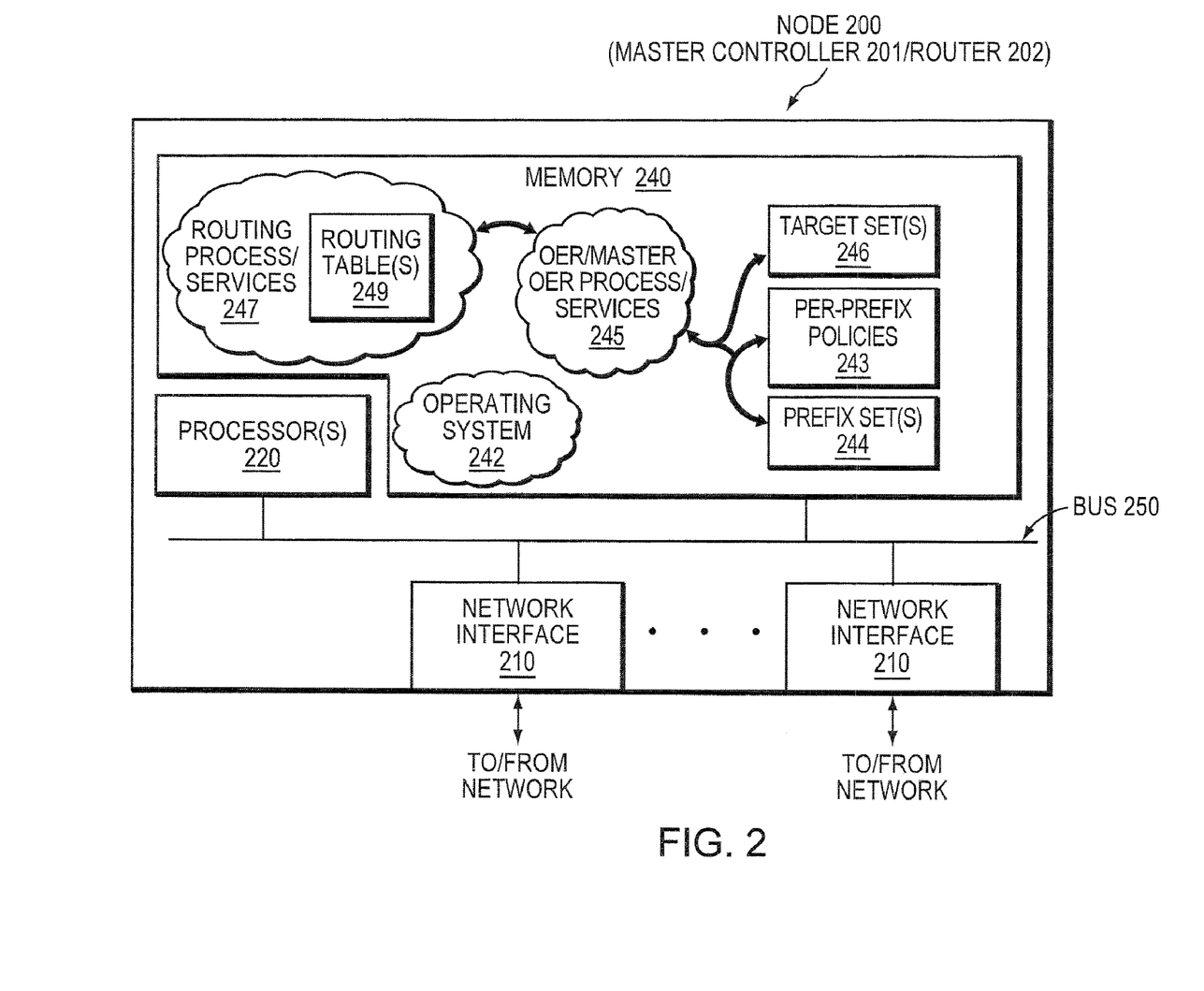
FIG. 2 illustrates an example network device/node.

FIG. 2 is a schematic block diagram of an example node/device 200 that may be advantageously used with one or more embodiments described herein, e.g., as routing master controller ("201") or a router (e.g., edge router, "202"). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. Each processor 220 may comprise necessary elements or logic adapted to execute the software programs and manipulate the data structures, such as routing tables 249, target set(s) 246, per-prefix policies 243, and prefix set(s) 244. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 247, and OER/Master OER process/services 245 in accordance with one or more embodiments described herein. It will be apparent to those skilled in the art that other types of processors and memory, including various computer-readable media, may be used to store and execute program instructions (e.g., software) pertaining to the inventive technique described herein.

Routing process/services 247 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage one or more routing/forwarding information database (e.g., routing tables 249) containing, e.g., data used to make routing and forwarding decisions. Specifically, the routing tables are generally used for storing reachable destination addresses, a next-hop interface, and next-hop address to reach each destination, and optionally other information, such as an associated metric (e.g., cost) of reaching the destination, based on network topology. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown), or tunneling protocols, such as for Multi-Protocol Label Switching, etc., each as will be understood by those skilled in the art.

OER/Master OER process/services 245 contain computer executable instructions executed by each processor 220 to perform functions illustratively employed by an OER node 202 (e.g., edge routers ER1-ER2) and an OER master controller 201, respectively. The Master OER process 245 executing on the OER Master node communicates with edge routers ER1-ER2 to request, among other things, the monitoring of a set of address prefixes (e.g., in particular, according to the novel techniques described herein). The OER processes 245 executing on the edge routers monitor traffic at the edge of the local domain (AS1) and respond with, inter alia, network statistics corresponding to the monitored prefixes. Illustratively, OER process 245 may be configured to measure various types of network statistics acquired from monitored traffic. (Notably, while one OER process 245 is illustratively in memory 240, instances of the OER process 245 may execute on the network interfaces 210 (not shown).) These statistics are then forwarded to the Master OER process 245. The statistics may correspond to various traffic measurements, such as round-trip delay times (RTT), data throughput (i.e., the amount of data transferred or received), packet loss, reachability, etc. for each of the monitored prefixes. In general, the OER processes 245 may measure any arbitrary traffic metric, including conventional cost-based and distance-based metrics. Further, the OER process 245 may calculate statistical averages, variances, medians, etc. of a collection of traffic measurements.

The statistics and measurements received from the OER process 245 of the edge routers 202 may then be processed at the OER master controller 201 in accordance with the Master OER process 245. More specifically, the Master OER process 245 analyzes the statistics and determines whether the distribution of traffic entering and/or leaving the local domain can be optimized. If so, the Master OER process may redistribute traffic routed through the edge nodes by, e.g., associating new BGP local-preference values with selected traffic or statically changing the routing table contents of the edge nodes (which may then be propagated within the local domain accordingly). In that sense, the Master OER process selects optimal exit links (OELs) (that is, a "best exit selection") to various destination prefixes, e.g., based on traffic type, traffic class, destination prefixes, etc., in addition to their real-time performance as determined by the received statistics. Ultimately, the end result is improved Internet performance, better load distribution, and/or lower costs for Internet connections. Notably, the Master OER process 245 may be distributed among a plurality of nodes, and thus need not reside in a single OER master controller 201. Also, it is not necessary for a single OER master controller to contain routing processes or routing tables, other than what is necessary for communication with the border nodes.

In order to obtain statistics, the OER processes 245 may passively monitor and/or actively probe the monitored prefix. Passive monitoring relies on gathering information from OERs learned from monitoring conventional user traffic, such as throughput, timing, latency, packet loss, reachability, etc. Active probing, on the other hand, relies on probe packets to measure various parameters associated with accessing the monitored prefix from an originating node (source). Probe packets are used by an edge node/router to measure various parameters (e.g., jitter, delay, loss, reachability, etc.) associated with reaching the monitored prefix (e.g., a target prefix) in the network. Specifically, probe packets (requests) are generated by the edge router 202 (OER process 245), generally upon a request from the OER Master Controller 201, and transferred to a target node associated with the target prefix. The target node acquires each probe packet, and returns a response (reply) to the border node, such as by, e.g., modifying and returning the probe packet, returning a newly-generated response packet, or including the desired response information in a modified conventional return message (e.g., an ACK message). The border node then uses the returned probe packet to measure the various parameters associated with reaching the target prefix, and returns the results to the OER Master controller.

For instance, assume that edge router ER1 in the local domain measures round-trip packet delay times (RTT) for traffic sent to target T1 in a remote domain, such as by measuring latencies of establishing a TCP session. The OER processes 245 of ER1 measure the latency between sending a TCP synchronize-sequence-number (SYN) packet to T1 and receiving a corresponding acknowledgement (ACK) packet. Alternatively, the OER processes may employ other techniques for measuring the round-trip delay times, such as issuing conventional "echo" packets (or "ping" packets). Those skilled in the art will understand that the probe packets may be used with a number of known protocols, such as ICMP, UDP, TCP, RTP, HTTP, etc. Notably, echo request and reply messages (echo packets) from the various protocols are described generally herein as probe packets/messages. Moreover, it may be desirable to control the rate at which the probe packets are sent to the targets to thereby avoid refusal (filtering) by the ISP from what may appear to be a "denial of service" or "DoS" attack, for instance, as detected by an intrusion detection system (IDS). As a result, the rate at which probe packets are sent may be limited to a very slow rate, e.g., one probe packet per minute.

The edge routers 202 send the probe packets to various targets that represent a given monitored prefix. Targets within the given prefix may either be configured targets or learned targets. A configured target may be manually configured by a system administrator or customer at the OER Master node. An example of a configured target may be where an administrator has an agreement with the target in the prefix, e.g., such as a target using UDP. Each configured target is assumed to be usable, such as where the agreement between networks (domains/ASes) ensures that a valid response will be returned.

A learned target, on the other hand, is a target that may be learned by monitoring traffic at the exits. For instance, a learned target can be determined by monitoring traffic that a data connection has been made from an exit to a particular node in the monitored prefix, (e.g., by detecting a TCP connect). From this information, a list can be created of nodes within a prefix, such as T1-Tn. An example software application that may be used to collect network statistics is NetFlow™ by Cisco Systems, Inc. These learned nodes from the target prefix may then be used as the learned targets. Typically, although not necessarily, the most frequently used nodes or the nodes with the highest traffic throughput will be the most representative learned target nodes for a given prefix, such as a web server within the prefix. It may be desirable, however, to use configured targets prior to using learned targets.

One issue that arises with the use of targets to represent an entire monitored prefix is how to determine if a target is a valid target. For example, while a responding target is a valid target that can be used to measure parametric information, a non-responding target may be caused by a network problem, e.g., policy filtering (e.g., firewalls), blackholes, brownouts, etc., or simply that the target (host) itself was turned off (e.g., for maintenance or other reasons) or otherwise not responding for its own specific (non-network related) reason. In the case of a non-responding target, non-response due to a network problem such as a failure is valid for purposes of measuring parametric information for the monitored prefix, since a network failure in reaching the target may apply to reaching the entire monitored prefix. Non-response due to the target itself being powered off or otherwise inaccessible or inactive is not valid for measuring parametric information, because it does not represent the monitored prefix as a whole. Also, in the event that all representative targets for a monitored prefix do not respond, the source may improperly conclude that the entire prefix is unreachable, while the prefix in general (other than the non-responding targets) may still exist and function properly.

An illustrative target management technique, therefore, may dynamically select an optimal set of valid targets (e.g., set 246) for a particular (monitored) prefix of the computer network. Specifically, one or more targets may be selected from a pool of possible learned and configured targets to be used as representatives of the monitored prefix. Probe packets may be sent from the source to the selected targets for the duration of an evaluation period. Targets that do not respond to the probe packets during the evaluation period are invalid and deselected, and if available, an unused target is selected from the pool of possible targets to replace each non-responding target for a next evaluation period. Invalid learned targets may be discarded, while invalid configured targets may be returned to the pool of possible targets for potential re-selection in a later evaluation period.

Notably, in a typical network, there are often multiple paths that may be available to reach a particular destination prefix (e.g., for multi-homed sites as discussed above). Active probing generally probes all available paths in order to determine the parametric information, thereby allowing OER processes to select one or more preferred paths from the set of all paths (e.g., according to a specified policy). Actively probing all available paths all the time to determine the best path requires significant resources on the probe source (router), the target and, generally, the network. As those skilled in the art will understand, the network is more likely to filter probe responses during the probing of all paths, while the probing may actually create congestion that impacts the quality of each probe packet and response.

An illustrative technique may thus be utilized for efficiently sending probe packets from a source to a target in a destination prefix over two or more paths of a computer network. For example, OER processes 245 may send probe packets over a selection of one or more (e.g., all) available paths (exits) to the target in the destination prefix (e.g., through the edge routers 202). Once the preferred path is selected ("path selection optimization"), the source OER processes 245 may send probes to that target only over the preferred path until a trigger occurs, such as, e.g., an out of policy (OOP) event, a policy change, or an optional timer-based trigger. Upon being triggered, the source again probes all paths (the current path and the alternate/non-current paths) to reselect the preferred path to reach the target (i.e., the associated destination address prefix).

As noted, where multiple paths/exits are available to a local network domain, various techniques may be used to distribute traffic across the multiple exits based on performance measurements of particular traffic-classes. For example, through either passive monitoring or active probing for each traffic-class, traffic for each traffic-class may be routed/forwarded over a specific best performing path/exit to reach a particular destination address prefix in a remote domain.

Again, though, these performance measurements, however, while being generally accurate in determining a best performing path per-traffic class and per-prefix, may suffer from various shortcomings. For example, in certain situations only a few probe targets may be known/available for a particular traffic-class and destination address prefix. As such, if those targets are non-responsive (e.g., firewalls, network address translation or "NAT" issues, etc.), then probing those targets for traffic optimization results in the traffic-class to that destination address prefix being classified as unreachable, and thus is not controlled based on a best performing path, regardless of whether other destinations within that prefix are reachable. Also, determining a best performing path per-traffic class and per-prefix may require a large number of probes (and probe targets, e.g., to reduce the occurrence of the example mentioned above), which may be poorly scalable for large networks. Moreover, if all prefixes are in a same geographical proximity or have a same/shared performance for the "last mile" (as will be understood by those skilled in the art), then probing all of the targets could be redundant and could consume significant resources.

Sharing Performance Measurements Among Address Prefixes of a Same Domain

According to embodiments of the disclosure, a local domain may obtain performance measurements from a set of one or more responding targets of a particular remote domain (e.g., active probe message transmission or passive monitoring). The performance measurements may then be applied to prefix-specific policies of any corresponding destination address prefix within the particular remote domain, such that traffic destined to a particular prefix of the particular remote domain may be routed from the local domain based on the corresponding prefix-specific policies and applied performance measurements.

Illustratively, one or more embodiments described herein may utilize OER processes (or "performance routing" process) 245 to share performance measurements among address prefixes of a same domain when optimizing routing in accordance with one or more embodiments described herein. In particular, Master OER process 245 of an RMC may operate to control various aspects of the techniques described herein, being in cooperative collaboration with OER process 245 of edge routers as described above to send and receive probe messages as described herein, or to passively probe one or more known responding (functioning) targets. In other words, the performance routing or OER process 245 when executed may be operable to selectively probe/monitor targets (e.g., random targets) in a particular domain (e.g., an AS) to determine the performance measurements to reach the particular domain, and then extrapolating the performance measurements to destination address prefixes within that domain (e.g., within that AS).

Operationally, the RMC 201 may initially determine a set of prefixes (stored in set 244) that are located in a same remote domain. For example, the prefixes may be grouped by Origin AS, such as those prefixes having a same AS identification (ID) (e.g., prefixes P1-P3 and Pn in AS2, and prefixes P4-P7 in AS3, etc.). In particular, an AS is generally geographically localized, and as such, prefixes within an AS may generally result in similar performance characteristics when being reached from a domain in a different location. Alternatively, then, a domain may simply be a geographically localized collection of destination address prefixes, e.g., the geography as determined by techniques that may be appreciated by those skilled in the art (e.g., other than being within a same AS).

In addition, the RMC may also determine a set of responding targets located within the domain. These targets, in particular, do not correspond to any specific destination address prefix (but may or may not correspond to any specific traffic-class, described below); they simply should be within the desired remote domain. For instance, the RMC may learn several targets in the remote domain (e.g., T1-Tn of AS2, T4-T7 of AS3), but selects a few responding targets (e.g., less than ten, for example, five) to measure performance across the network at each path/exit from the local domain.

For better measurements and to avoid IDS triggers, the targets may be rotated (changed) periodically for better measurement and to avoid IDS triggers. Optionally, the RMC may periodically flush all the targets of set 246 and repeat the process of selecting responsive targets. Generally, management of the targets may be performed in a similar manner to that described above. For example, if ten targets are learned, where eight are responding and two are not, then the two non-responding targets would be deleted, and the remaining eight targets would be stored in target set list 246. Any subset of the targets (e.g., five of the eight targets) may then be used, for example, periodically changing which five for the reasons above. Notably, only those targets that are known to be responsive may be used, such that if it is determined that no response is received from the target, the target is removed from set/list 246.

Notably, to increase the likelihood of probe responsiveness, probe messages may be configured to have a destination of a known server port. For example, probe targets may be selected that have packets destined to it on port 80 (a hypertext transfer protocol (http) port), a TCP port, or any other well-known server port. Also, to increase confidence in the shared performance measurements (described below), the set of targets 246 may be determined based on path diversity of the paths to reach the targets with the probe messages. For example, by knowing the paths from the local domain to the targets (e.g., no more than one target per prefix within a domain, or by using a known "traceroute" technique to determine paths within a remote domain), selecting targets with more diverse paths spreads out the performance measurements to obtain a broader spectrum of representative information. Note that each prefix of a domain need not be represented by a probed target, such as prefix P3.

Figure 3A:
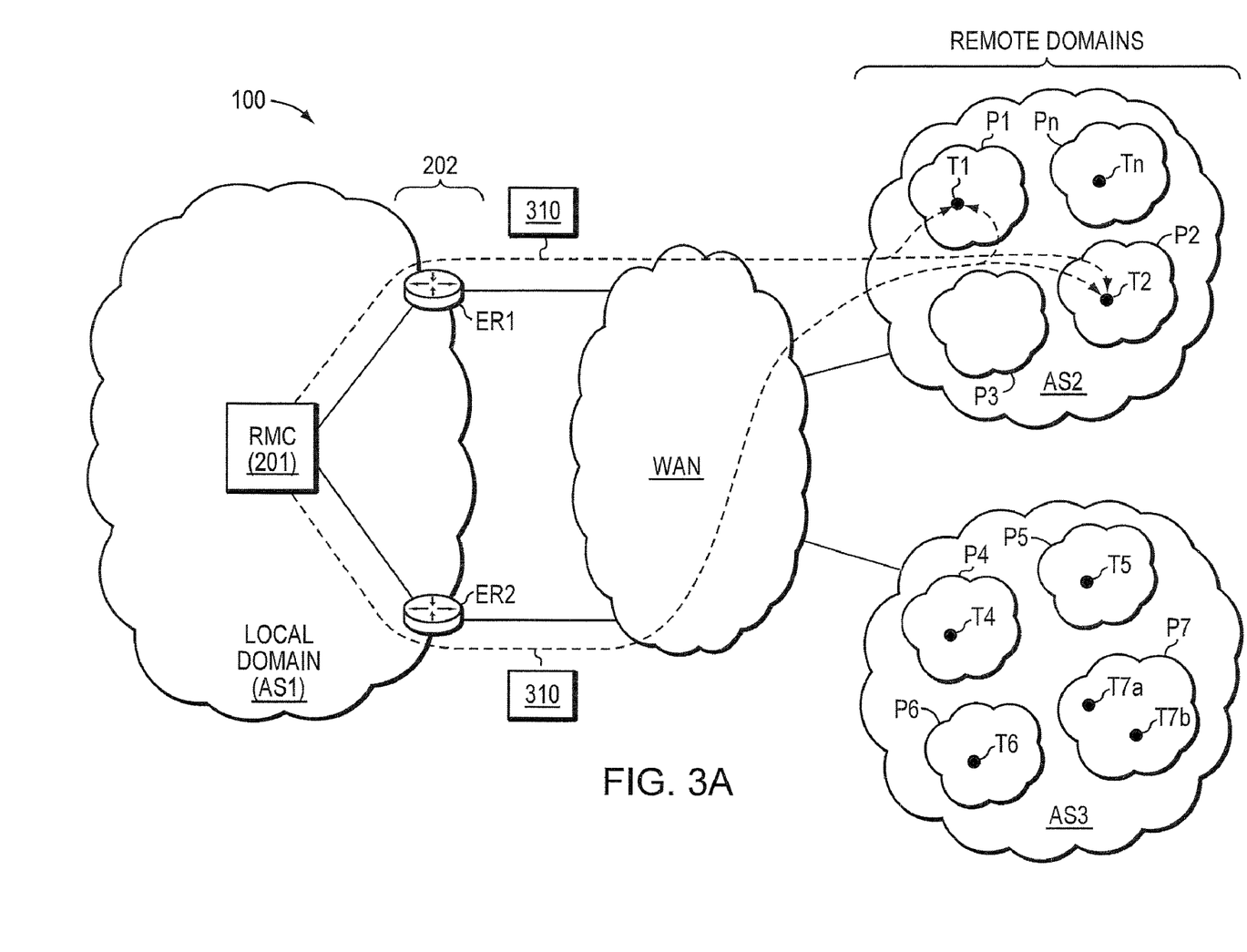
FIG. 3A illustrates an example transmission of probe messages.

Once the targets are determined, the RMC may illustratively transmit (or may request transmission of) probe messages from the local domain to the set of targets via each of the probed first-hop domains. For instance, each edge/exit router of a probed domain, e.g., ER1-ER2, may transmit a probe message toward each of the probed targets (e.g., T1 and T2). Briefly, FIG. 3A illustrates the network 100 of FIG. 1 with probe messages/packets 310 being transmitted in such a manner. To determine performance measurements of each probed path/exit, the RMC may collect responses to the probe messages, thus obtaining gathered performance measurements as described above. (Notably, as mentioned herein, passive monitoring of selected targets may also be used to obtain performance measurements in addition to or as an alternative to actively probing the targets. The embodiments described herein, therefore, are not necessarily limited to either active probing or passive monitoring, accordingly, and active probing is used specifically hereinafter as an illustrative example technique to obtain performance measurements.)

Currently, as mentioned above, assume that a set of prefixes are being optimized, such as any prefix within the range of 10.1.X.0/24 (where "X" illustratively represents 100 different prefixes, for an example). If an RMC were to probe up to five hosts/targets per path/exit for each of the 10.1.X.0/24 prefixes to determine the performance of the prefixes on various paths, there would be a total of 5*100=500 probe messages for the 10.1.X.0/24 prefixes on each path (e.g., 1000 probe messages total in the network with two exits/edge routers ER1 and ER2). These probes may or may not respond, and scalability is an issue. According to the techniques described herein, then, if all of the destination address prefixes in the optimized range of 10.1.X.0/24 are in the same domain (e.g., the same AS), the RMC could share the probing results (performance measurements) from far fewer responding probe targets (e.g., five).

Figure 3B:
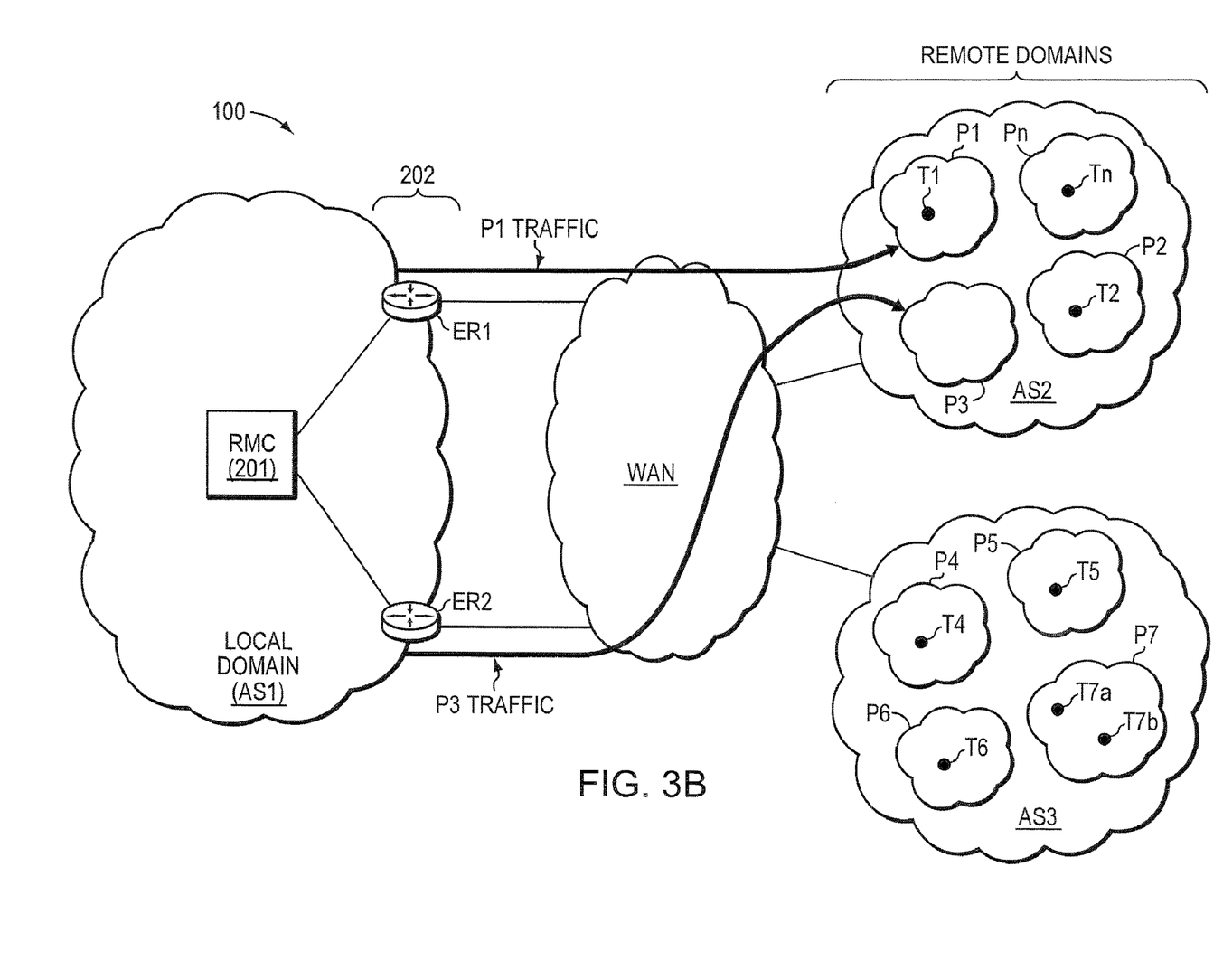
FIG. 3B illustrates an example distribution of traffic.

In particular, the obtained performance measurements may be applied to (shared with) prefix-specific policies 243 of any corresponding destination address prefix within the particular remote domain (of set 244). That is, the measurements of the responding probes can be extrapolated and applied against policies of all prefixes in the same domain (e.g., Origin AS) on a per-prefix basis (where each policy applied to a particular prefix is a "prefix-specific policy" for that particular prefix). Routing decisions for traffic destined to a particular prefix of the particular remote domain may thus be made based on the corresponding prefix-specific policies and applied performance measurements. FIG. 3B illustrates an example set of paths that may be taken by particular traffic flows based on the destination address prefix of the flow (e.g., P1 and P3) and the corresponding prefix-specific policy according to the shared performance measurements of the domain (e.g., AS2). For instance, traffic may be routed based on whether the performance measurements are in-policy or out-of-policy according to the corresponding prefix-specific policies. Note that, as mentioned above, prefixes without target representation (e.g., P3) may use the performance measurements of the domain (e.g., AS2) in general in accordance with the techniques described herein.

Notably, it is possible that when the probe results are extrapolated and applied to a plurality of different prefixes in the same remote domain, one prefix may be out-of-policy on a particular path/exit, while another is in-policy. As such, the out-of-policy prefix (e.g., traffic-class) may be rerouted, which is the desired behavior. For example, assume that prefix P1 in Origin AS2, and that its policy threshold is that packet loss must be less than 1% (e.g., it is performance sensitive traffic). Alternatively, prefix P3, also in Origin AS2, has a policy threshold that states that packet loss must only be less than 20%. Probe targets T1 and T2 are probed (receive probe messages 310) over all available paths (via ER1 and ER2) to measure performance of all the paths to T1 and T2. If the probing result yields that loss on the path via ER2 is 5% (e.g., average to the two targets or the worse of the two), and loss on the path via ER1 is 0%. Performance routing process 245 (RMC) may correspondingly route (or reroute/move) the prefix P1 over the path/exit via ER1, and prefix P3 over the path/exit via ER2. Probe results may continue to be extrapolated from the domain AS2 based on any targets in the domain and may continue to be applied to all prefixes (e.g., both P1 and P3), such than any changes may be accounted for, accordingly.

The techniques described herein, therefore, probe performance measurements corresponding to a remote domain as a whole, and not of a particular prefix. In other words, the techniques described herein attempt to locate key responding targets in a remote domain (e.g., an AS), and use the performance measurements of the corresponding probe messages to extrapolate performance of individual prefixes within the same domain. (Notably, in the event a particular prefix within a domain should fail outright, and no probe messages 310 were being sent to that prefix, the RMC may not detect the failure until conventional network convergence, e.g., BGP, which would be no different had there been no performance routing performed in the network anyway.)

In addition (or as an alternative), as mentioned above the probe messages may correspond to a particular traffic class. In this manner, probe messages may be transmitted per traffic class, and thus performance measurements per traffic class may be obtained, and applied to prefix-specific policies for the particular traffic class of any corresponding destination address prefix within the particular remote domain. Accordingly, traffic of the particular traffic class may be routed based on the corresponding prefix-specific policies and applied performance measurements for that traffic class. For example, assume that high priority traffic performs better on one path, while low priority traffic performs better on another path, but to the same remote domain. Non-traffic-class based probe messages may not detect this difference, and the better of the two paths for any priority traffic (or, more specifically, any non-priority traffic) may be selected. By including traffic class, greater distinction in policy application may be achieved, but at the added cost (tradeoff) of additional probe messages (dependent upon the number of additional traffic classes to be specifically probed).

Figure 4:
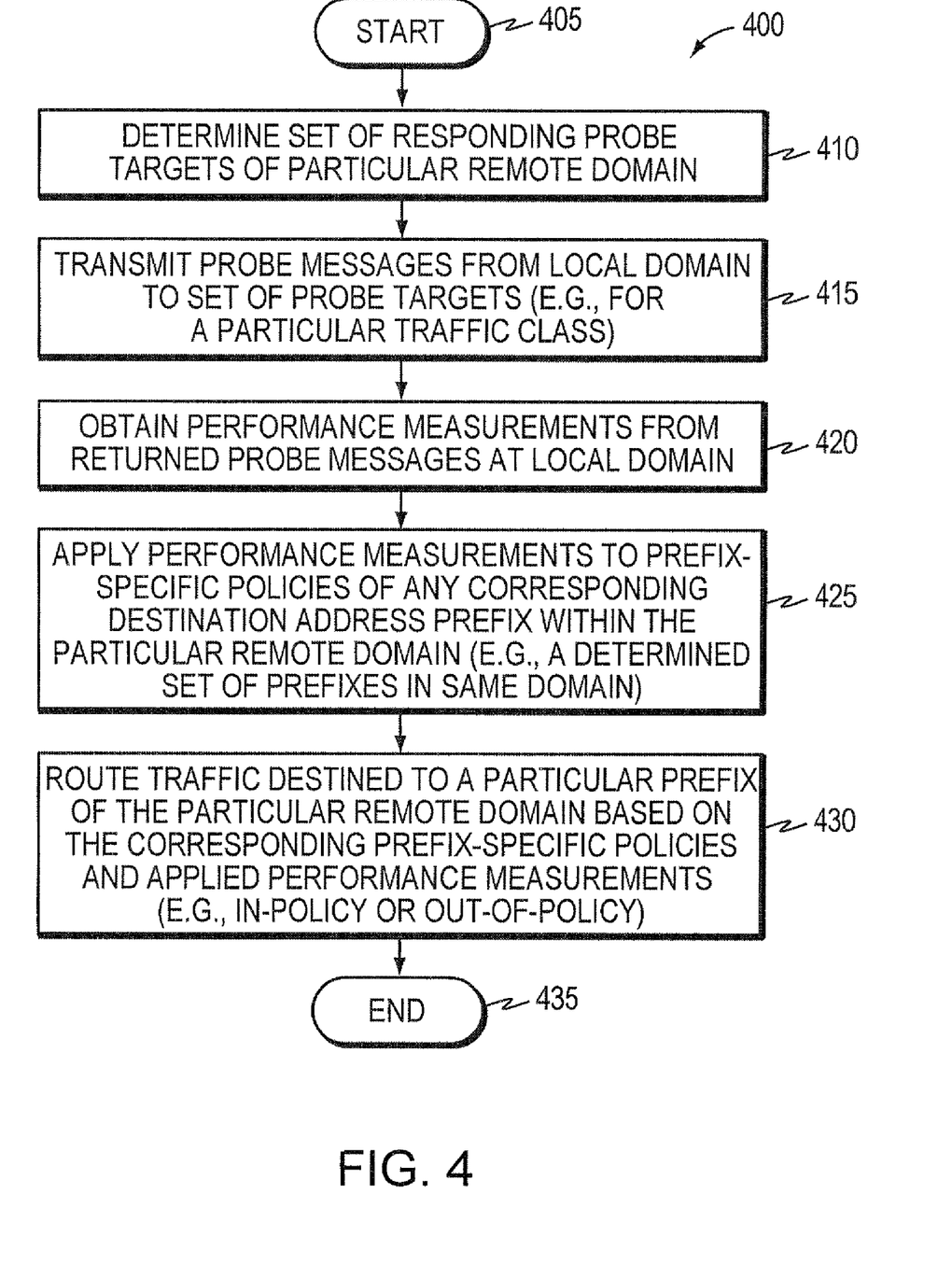
FIG. 4 illustrates an example procedure for sharing performance measurements among address prefixes of a same domain.

FIG. 4 illustrates an example procedure 400 for sharing performance measurements among address prefixes of a same domain in accordance with one or more embodiments described herein. (As mentioned above, while the example procedure 400 illustrates active probing, passive monitoring may also be used to obtain performance measurements.) The procedure 400 starts at step 405, and continues to step 410, where a set 246 of responding probe targets of particular remote domain (e.g., T1, T2, etc., of AS2) may be determined as described above (e.g., periodically changed). In step 415, probe messages 310 may be transmitted from the local domain (e.g., from ER1 and ER2) to the set of probe targets. For example, as mentioned above, probe messages 310 may be generic, or may apply to a specific traffic class (for use with policies relating to that specific traffic class, as detailed above).

Upon receiving returned probe messages, the RMC 210 of the local domain may accordingly obtain performance measurements in step 420, and may thus apply those performance measurements in step 425 to prefix-specific policies 243 of any corresponding destination address prefix within the particular remote domain. That is, by determining the set 244 of prefixes in the same remote domain (e.g., those with an AS ID of "AS2"), the RMC may apply the performance measurements to each of the prefixes of that determined set.

As described above, then, the RMC in step 430 may configure the network (local domain) to route traffic destined to a particular prefix of the particular remote domain (AS2) based on the corresponding prefix-specific policies and applied performance measurements. In other words, the traffic may be routed according to whether a particular probed path/exit is in-policy or out-of-policy according to the prefix-specific policies as applied to the collective performance measurements for the shared domain. The procedure 400 ends in step 435, notably with the inherent option to return to step 410 to update probed targets, or 415 to reuse the same set of targets, etc. for further performance measurements.

Advantageously, the novel techniques described herein share performance measurements among address prefixes of a same domain in a computer network. By sharing the measurements, the novel techniques may extrapolate the performance measurements (e.g., per traffic class) within the same domain (e.g., AS), thus resulting in better scalability (reduced probing) and possibly a greater number of responding targets that may be used for a particular prefix. For example, a prefix may not have a known responding target, and as such, measurements obtained from responses of other targets in the same domain may be used. Also, since there are more available targets (generally), non-responsive targets may be rotated out of a larger pool of potential targets. Further, the dynamic aspects of one or more embodiments described herein alleviate the need for cumbersome and inefficient manual configuration.

While there have been shown and described illustrative embodiments that share performance measurements among address prefixes of a same domain in a computer network, it is to be understood that various other adaptations and modifications may be made within the spirit and scope of the present invention. For example, the embodiments have been shown and described herein are directed to address prefixes of a same network domain (e.g., AS). However, the embodiments of the invention in their broader sense are not so limited, and may, in fact, be used with other set/subsets pairs, where the policies are based on (defined for) the subsets, and the subsets share a commonality (a set) that may be used to aggregate the subsets (e.g., physical location, logical organization, etc.). Also, while various protocols are mentioned herein, such protocols are meant to be illustrative, and not limiting to the scope of the embodiments herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining a set of one or more responding targets of a particular remote domain, the one or more responding targets corresponding to one or more prefixes of a plurality of prefixes within the particular remote domain;
   obtaining, at a local domain, one or more performance measurements from the set of one or more responding targets of the particular remote domain;
   applying the performance measurements to prefix-specific policies of any corresponding prefix within the particular remote domain, including prefix-specific policies of at least one prefix of the plurality of prefixes within the articular remote domain other than the prefixes for which there are corresponding responding targets; and
   routing traffic from the local domain destined to a particular prefix of the particular remote domain based on the corresponding prefix-specific policies and applied performance measurements.

2. The method as in claim 1, further comprising:
   determining a set of prefixes that are located in a same remote domain, the set of prefixes including the one or more prefixes which there are corresponding responding targets and the at least one prefix other than the prefixes for which there are corresponding responding targets.

3. The method as in claim 1, further comprising:
   obtaining performance measurements from no more than one target in a same prefix.

4. The method as in claim 1, wherein routing further comprises:
   routing traffic destined to a particular prefix based on whether the performance measurements are in-policy or out-of-policy according to the corresponding prefix-specific policies.

5. The method as in claim 4, wherein at least one prefix is out-of-policy and at least one prefix is in-policy for a particular route based on corresponding prefix-specific policies for the respective prefixes using the same performance measurements.

6. The method as in claim 1, wherein a domain is an autonomous system (AS).

7. The method as in claim 6, further comprising:
   determining a set of prefixes that are located in a same remote domain by those prefixes having a same AS identification.

8. The method as in claim 1, wherein a number of targets from which performance measurements are obtained is less than ten.

9. The method as in claim 1, wherein the set of one or more responding targets are a set of one or more responding probe targets, and the method further comprises:
   transmitting one or more probe messages from the local domain to the set of probe targets; and
   obtaining the one or more performance measurements from returned probe messages at the local domain.

10. The method as in claim 9, further comprising:
    transmitting the one or more probe messages from the local domain to the set of probe targets for a particular traffic class;
    obtaining one or more performance measurements from returned probe messages at the local domain for the particular traffic class;
    applying the performance measurements to prefix-specific policies for the particular traffic class of any corresponding destination address prefix within the particular remote domain; and
    routing traffic of the particular traffic class destined to the particular prefix of the particular remote domain based on the corresponding prefix-specific policies and applied performance measurements.

11. The method as in claim 9, wherein transmitting further comprises:
    transmitting the probe messages as echo messages.

12. The method as in claim 9, further comprising:
    determining the set of responding probe targets based on path diversity of paths to reach the targets with the probe messages.

13. The method as in claim 1, further comprising:
obtaining one or more performance measurements at the local domain for a particular traffic class;
applying the performance measurements to prefix-specific policies for the particular traffic class of any corresponding destination address prefix within the particular remote domain; and
routing traffic of the particular traffic class destined to the particular prefix of the particular remote domain based on the corresponding prefix-specific policies and applied performance measurements.

14. The method as in claim 1, wherein a domain is a geographically localized collection of destination address prefixes.

15. The method as in claim 1, further comprising:
determining the set of responding targets as a subset of a plurality of responding targets.

16. The method as in claim 1, further comprising:
periodically changing the set of responding targets.

17. An apparatus, comprising:
one or more network interfaces configured to transmit traffic to and receive traffic from a plurality of exits of a local domain of a computer network;
a processor coupled to the network interfaces and adapted to execute one or more processes; and
a memory configured to store a performance routing process executable by the processor, the performance routing process when executed operable to:
determine a set of one or more responding targets of a particular remote domain, the one or more responding targets corresponding to one or more prefixes of a plurality of prefixes within the particular remote domain;
obtain one or more performance measurements from the set of one or more responding targets of the particular remote domain;
apply the performance measurements to prefix-specific policies of any corresponding prefix within the particular remote domain, including prefix-specific policies of at least one prefix of the plurality of prefixes within the particular remote domain other than the prefixes for which there are corresponding responding targets; and
route traffic from the local domain destined to a particular prefix of the particular remote domain based on the corresponding prefix-specific policies and applied performance measurements.

18. The apparatus as in claim 17, wherein a domain is an autonomous system (AS), and wherein the performance routing process when executed is further operable to:
determine a set of prefixes that are located in a same remote domain by those prefixes having a same AS identification.

19. The apparatus as in claim 17, wherein the performance routing process when executed is further operable to:
obtain one or more performance measurements for a particular traffic class;
apply the performance measurements to prefix-specific policies for the particular traffic class of any corresponding destination address prefix within the particular remote domain; and
route traffic of the particular traffic class destined to the particular prefix of the particular remote domain based on the corresponding prefix-specific policies and applied performance measurements.

20. The apparatus as in claim 17, wherein the set of one or more responding targets is a set of one or more responding probe targets, and wherein the performance routing process when executed is further operable to:
transmit one or more probe messages from the local domain to the set of probe targets; and
obtain the one or more performance measurements from returned probe messages at the local domain.

21. A non-transitory computer-readable media having software encoded and stored thereon, the software when executed operable to:
determine a set of one or more responding targets of a particular remote domain, the one or more responding targets corresponding to one or more prefixes of a plurality of prefixes within the particular remote domain
obtain, at a local domain one or more performance measurements from the set of one or more responding targets of the particular remote domain;
apply the performance measurements to prefix-specific policies of any corresponding prefix within the particular remote domain, including prefix-specific policies of at least one prefix of the plurality of prefixes within the particular remote domain other than the prefixes for which there are corresponding responding targets; and
route traffic from the local domain destined to a particular prefix of the particular remote domain based on the corresponding prefix-specific policies and applied performance measurements.

22. The computer-readable media as in claim 21, wherein the set of one or more responding targets is a set of one or more responding probe targets, and wherein the software when executed is further operable to:
transmit one or more probe messages from the local domain to the set of probe targets; and
obtain the one or more performance measurements from returned probe messages at the local domain.

* * * * *

UNITED STATES PATENT AND TRADEMARK OFFICE
CERTIFICATE OF CORRECTION

PATENT NO. : 7,848,230 B2  
APPLICATION NO. : 12/266182  
DATED : December 7, 2010  
INVENTOR(S) : Pritam Shah et al.

Page 1 of 1

It is certified that error appears in the above-identified patent and that said Letters Patent is hereby corrected as shown below:

Col. 12, Line 2, please replace "articular" with --particular--

Signed and Sealed this
Tenth Day of May, 2011

David J. Kappos
*Director of the United States Patent and Trademark Office*